UNITED STATES PATENT OFFICE.

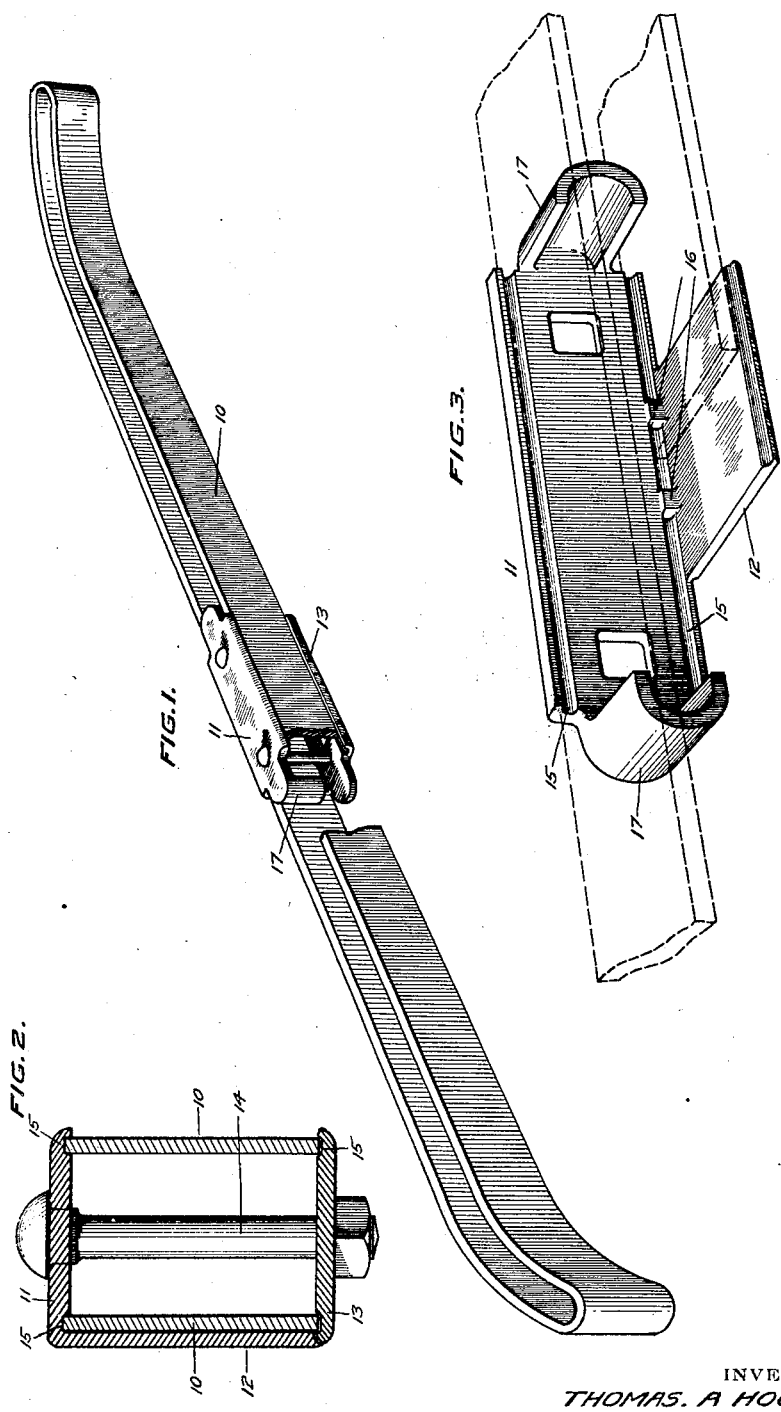

THOMAS A. HOOVER, OF FRESNO, CALIFORNIA, ASSIGNOR TO AMERICAN CHAIN COMPANY, INC., A CORPORATION OF NEW YORK.

AUTOMOBILE-BUMPER.

1,388,432.  Specification of Letters Patent.  Patented Aug. 23, 1921.

Application filed February 24, 1920, Serial No. 361,066. Renewed May 10, 1921. Serial No. 468,202.

*To all whom it may concern:*

Be it known that I, THOMAS A. HOOVER, a citizen of the United States, residing at Fresno, in the county of Fresno and State of California, have invented new and useful Improvements in Automobile-Bumpers, of which the following is a specification.

This invention relates to bumpers for automobiles and other vehicles, and more particularly to a bumper of the double spring bar type. The object is to simplify and improve the manufacture and assembly of a bumper of this type.

In prior bumpers of the type under consideration, a single piece of spring metal is bent into the form of a double bar bumper and the meeting ends of the bar are secured together either by welding or by means of bolts passing through openings in the spring bar. There are obvious objections to the use of such means and methods for uniting the ends of the spring bar, and in the present invention I provide a coupling for the meeting ends of the bar, such that these ends will be held together without the necessity of welding or drilling holes in the spring bar and also these meeting ends, if disposed at the front of the bumper, will be concealed from view. Furthermore, the coupling serves as a space block to retain the walls of the bumper apart.

In the accompanying drawing:—

Figure 1 shows a perspective view of a bumper embodying the coupling device of the present invention.

Fig. 2 shows a vertical transverse sectional view taken on the middle line of the bumper shown in Fig. 1.

Fig. 3 shows a perspective view of one member of the coupling in use on a bumper.

A spring bumper 10 is shown as being made up of a single piece of stock doubled, the ends being brought together at the middle line of the bumper. The coupling comprises two metal plates, one indicated at 11 and which has a flange 12 formed at its longitudinal edge, and the other part of the coupling being indicated at 13 which is preferably in the form of a flat piece. Considering the bumper in the position shown in Figs. 1 and 2, the meeting ends of the spring bar are disposed at the front of the bumper, and the plate 11 is on top with its flange 12 extending downwardly in front of the meeting ends of the spring bar. The plate 13 is at the other side of the bumper and is clamped in place by bolts 14 passing through openings in the plates 11 and 13 and extending vertically between the walls of the bumper. The plates 11 and 13 are each grooved as shown at 15 where they receive the edges of the spring bar. The plate 11 has two lugs 16 filling the groove 15, where the free ends of the bar come together as shown in Fig. 3. The ends of the spring bar are notched as with an emery wheel or file to receive the lugs 16, and therefore, when the parts are clamped together, the meeting ends of the spring bar are held against separating movement. Each end of the plate 11 is preferably provided with an inwardly extending semicircular flange 17 which acts as a filler or spacer block for the walls of the bumper.

The advantages of such a coupling are that welding of the ends of the bar may be dispensed with; also the drilling of holes in the spring bar to receive fastened bolts is eliminated. At the same time, the ends of the bar are securely locked against drawing apart and are also concealed by the flange 12. Furthermore, the two walls of the double bar bumper are held spaced apart by this opening.

Various changes in the construction and arrangement of the several parts may be employed without departing from the spirit of my invention as disclosed in the appended claims.

Having thus described my invention, what I claim and desire to secure by Letters Patent is:—

1. In a bumper of the double spring bar type, wherein the ends are brought together near the median line of the bumper, a coupling for the meeting ends of the bar comprising upper and lower plates, and clamping bolts for the plates extending vertically between the walls of the bumper, one of said plates being provided with lugs received in notches formed in the edges of the bumper bar near the ends thereof.

2. In a bumper of the double spring bar type, wherein the ends are brought together near the median line of the bumper at the front thereof, a coupling for the meeting ends of the bar comprising upper and lower plates, clamping bolts for the plates extending vertically between the walls of the bumper, and a flange on one longitudinal edge of one of the plates overlying the meeting ends of the bumper bar.

3. In a bumper of the double spring bar type, wherein the ends are brought together near the median line of the bumper, a coupling for the meeting ends of the bar comprising longitudinally extending upper and lower plates, clamping bolts for the plates extending vertically between the walls of the bumper, and inwardly extending flanges on the ends of one of the plates lying between the walls of the bumper and serving as spacer blocks therefor.

In testimony whereof I have hereunto set my hand.

THOMAS A. HOOVER.